US 8,786,459 B1

(12) United States Patent
Nieh

(10) Patent No.: US 8,786,459 B1
(45) Date of Patent: Jul. 22, 2014

(54) DIGITAL SIGNAGE DISPLAYS MONITORING DEVICE

(71) Applicant: Qniq Technology Corp., Taipei (TW)

(72) Inventor: Hsiao Wey Nieh, Taipei (TW)

(*) Notice: Subject to any disclaimer, the term of this patent is extended or adjusted under 35 U.S.C. 154(b) by 0 days.

(21) Appl. No.: 13/772,241

(22) Filed: Feb. 20, 2013

(51) Int. Cl.
*G08B 3/00* (2006.01)
*G06F 3/01* (2006.01)
*G06F 3/041* (2006.01)

(52) U.S. Cl.
CPC ............ *G06F 3/013* (2013.01); *G06F 3/041* (2013.01)
USPC ............... 340/691.6; 340/568.5; 340/5.91; 340/5.92; 348/159; 348/578; 348/579

(58) Field of Classification Search
CPC .................................. G06F 3/013; G06F 3/041
USPC ....................... 340/691.6, 568.5, 5.91, 5.92
See application file for complete search history.

(56) References Cited

U.S. PATENT DOCUMENTS

| 2006/0015531 A1* | 1/2006 | Fraind et al. ............... 707/104.1 |
| 2012/0154427 A1* | 6/2012 | Sugiyama ..................... 345/593 |

* cited by examiner

*Primary Examiner* — Tai T Nguyen

(57) ABSTRACT

A digital signage displays monitoring device includes a controller, a detector, and a connector. The controller has two ends to connect with the detector and the connector respectively. The sensors inside the detector are attached to the digital signage display, and the connector connects with the digital signage player. Detecting signals are sent to the display by the controller via the player. The sensors detect the detecting signals on the display, and send a feedback signal back to the controller for the detecting signal and the feedback signal being compared by a predetermined program to generate a result signal which indicates condition of the display being normal or out of order and a warning message corresponding to the result signal is sent to the remote control center via the network device in the player for subsequent processing.

10 Claims, 5 Drawing Sheets

DIGITAL SIGNAGE DISPLAYS MONITORING DEVICE

BACKGROUND OF THE INVENTION

1. Field of the Invention

The present invention relates to a digital signage displays monitoring device and, more specifically, to a device capable of remotely monitoring the digital signage displays or video wall without modifying the structures thereof.

2. Brief Description of Related Art

The conventional digital signage, which is also called the electronic billboard, multimedia billboard, or electronic advertisement billboard, is a communication platform of multimedia interaction to transmit effective information to target customer groups or audience groups of various commercial applications quickly. It is widely used in industries such as companies, schools, art galleries, shopping malls, hotels, government agencies, hospitals, banks, transportations and etc.

The conventional digital signage includes a player and a display. Multimedia information, which is designed by the user in advance and stored in the player, is output to the display by the player for being watched by the target customer groups or audience groups so as to reach the goal of information transmission. Besides, a network is provided in the player, and the multimedia information can be sent to the player via the network and then output to the display from the player.

To inspect if the conventional digital signage works normally or is out of order is carried out by maintenance personnel being sent to every site where the digital signage is located to check the condition of the signage personally. It is barely feasible if there are few displays in the digital signage, or they are distributed in a small area. However, it becomes difficult to work with the traditional way if there are a lot of displays in the digital signage, or they are distributed in a large area. Furthermore, it needs lots of costly labors to conduct the inefficient inspection job with the traditional way.

SUMMARY OF THE INVENTION

The primary aspect of the present invention is to provide a digital signage displays monitoring device which is able to monitor the digital signage displays with simple attached device without modifying the structure of the digital signage.

Another aspect of the present invention is to provide a digital signage displays monitoring device which is able to monitor the digital signage displays from a remote client console and to reduce the maintenance cost.

A further aspect of the present invention is to provide a digital signage displays monitoring device which is able to monitor a plurality of the digital signage from management centers.

A further aspect of the present invention is to provide a digital signage displays monitoring device which is compatible with the original signage as well such that no extra costs are needed for changing or modifying the signage and the displays thereof in addition to enhancing the monitoring efficiency.

BRIEF DESCRIPTION OF THE DRAWINGS

The detail structure, the applied principle, the function and the effectiveness of the present invention can be fully understood with reference to the following detailed description and accompanying drawings.

DETAILED DESCRIPTION OF THE PRESENT INVENTION

Figure 1:
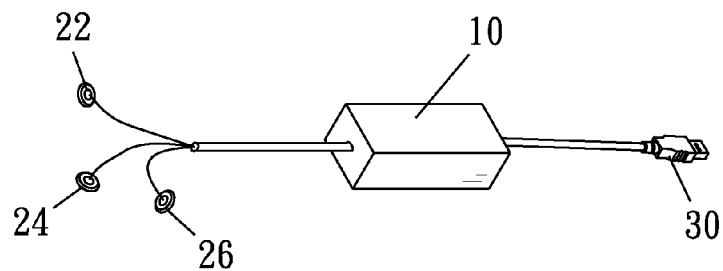
FIG. 1 is a perspective view illustrating the digital signage displays monitoring device.

Referring to FIG. 1, a preferred embodiment of the digital signage displays monitoring device according to the present invention is illustrated. The digital signage displays monitoring device comprises a controller 10, a plurality of sensors 22, 24, 26, and a connector 30. The controller 10 connects with the sensors 22, 24, 26 in one end, and the connector 30 in the other end. The sensors 22, 24, 26 are attached to a display 60 of the digital signage, and the connector 30 is plugged to a player 40 of the digital signage. Three sensors 22, 24, 26 recited in the embodiment are for exemplification only and not for limiting the invention, that is, it is workable to have a single sensor or more than three sensors.

Figure 2:
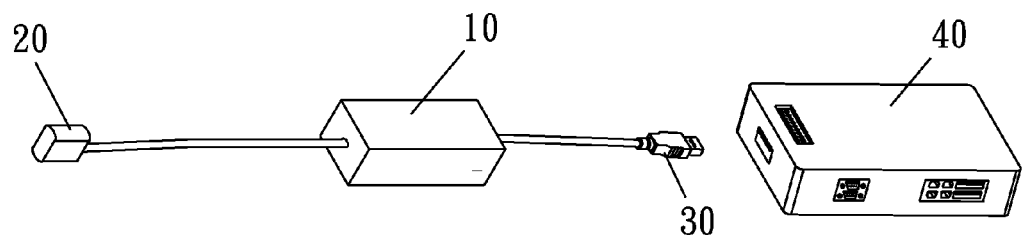
FIG. 2 is a perspective view illustrating a digital signage displays monitoring device and a player.
Figure 3:
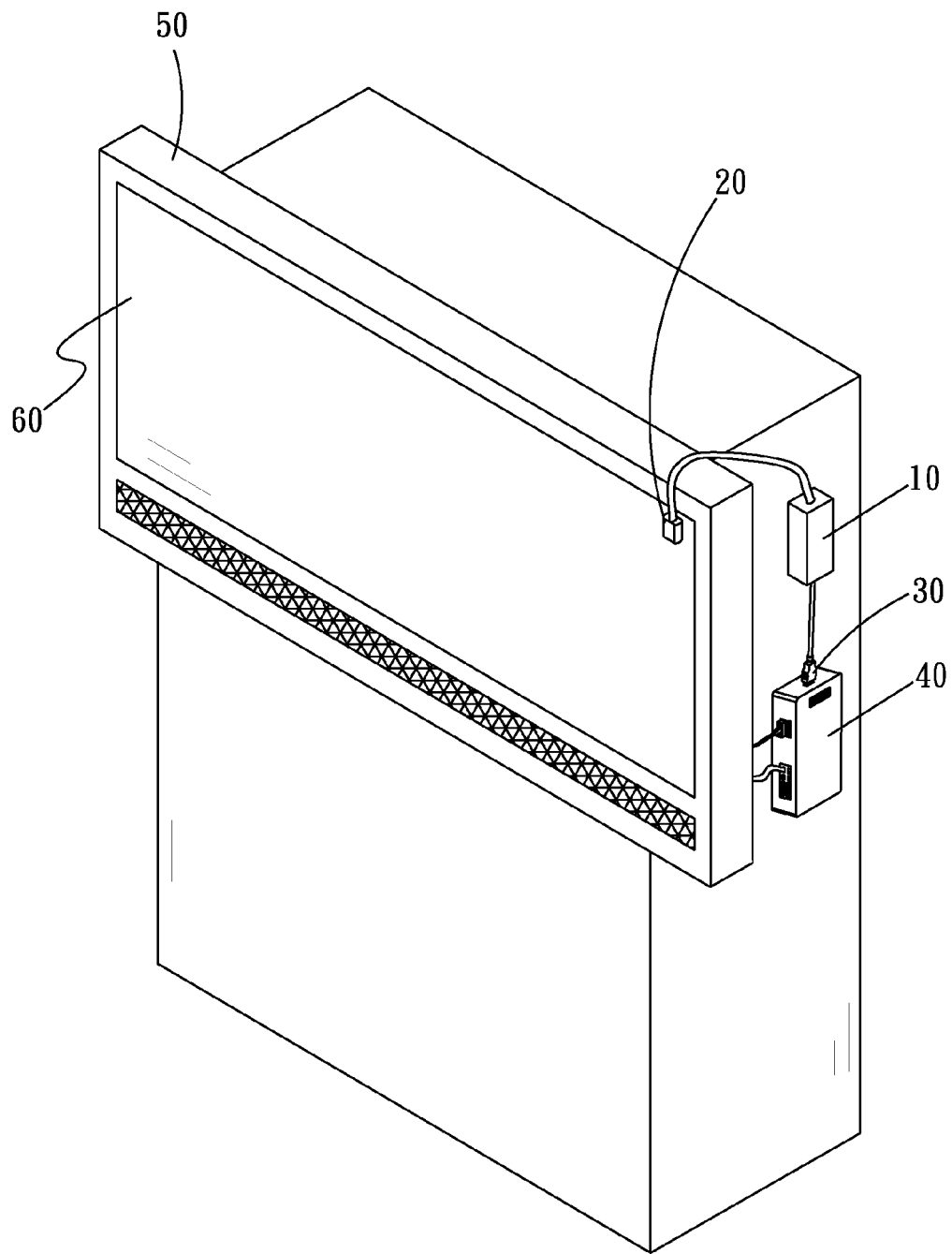
FIG. 3 is a combinational perspective view illustrating the monitoring device applying on a digital signage.

Referring to FIGS. 2 and 3 in company with FIG. 1 again, the sensors 22, 24, 26 are gathered to form a detector 20 for providing a good looking appearance, i.e., the sensors 22, 24, 26 are received in the detector 20. The controller 10 sends out different detecting signals continuously to the digital signage player 40 via the connector 30. The signals are further transmitted to the digital signage display 60 via the digital signage player 40. Then, the sensors 22, 24, 26 in the detector 20 detect the display 60, receive feedback signals from the display 60 and send the feedback signals back to the controller 10. The controller 10 has a predetermined program to compare the feedback signals with the signals sent out by the controller 10, analyze the comparison to obtain a result signal, and send a warning message to the connector 30 at the other end of the controller 10 based on the result signal. The warning message sent to the connector 30 is delivered to a management console 70 via the digital signage player 40 by a network device installed in the player 40. Afterwards, the operator in the management console 70 handles the subsequent process in accordance with the received messages.

The detector 20 is attached to the display 60 at a predetermined position with adhering, fastening, or the like. It is preferable that the predetermined position for the detector 20 is located at a spot not affecting the playing picture of the display 60 such as four corners of the display 60 to avoid the picture being covered to affect the viewing of users. It is appreciated from the preceding description that the detecting signal sent from the controller 10 is transmitted to the surface of the display 60 by the digital signage player 40; sensors 22, 24, 26 in the detector 20 detect the detecting signal on the display 60; the feedback signals received by the sensors 22, 24, 26 are sent back to the controller 10; the connector 30 connects with the digital signage player 40 and the detecting signal from the controller 10 is sent to player 40 through the connector 30; the controller 10 delivers the analyzed result signal to the player 40 after comparison between the detecting signals and the feedback signals is completed; the player 40 sends the result signal to the remote end via the network device in the player 40. It is noted that no network device is required in the controller 10 because the network device has been installed in the player 40. As a result, the controller 10 becomes simpler in structure and reduced in cost. The connector 30 is capable of communicating and being compatible with the digital signage player 40, and in the present embodiment, the USB connector is exemplarily adopted as the connector 30. Other types of connections such as RS-232. Bluetooth, WiFi, or the like are also feasible.

Figure 4:
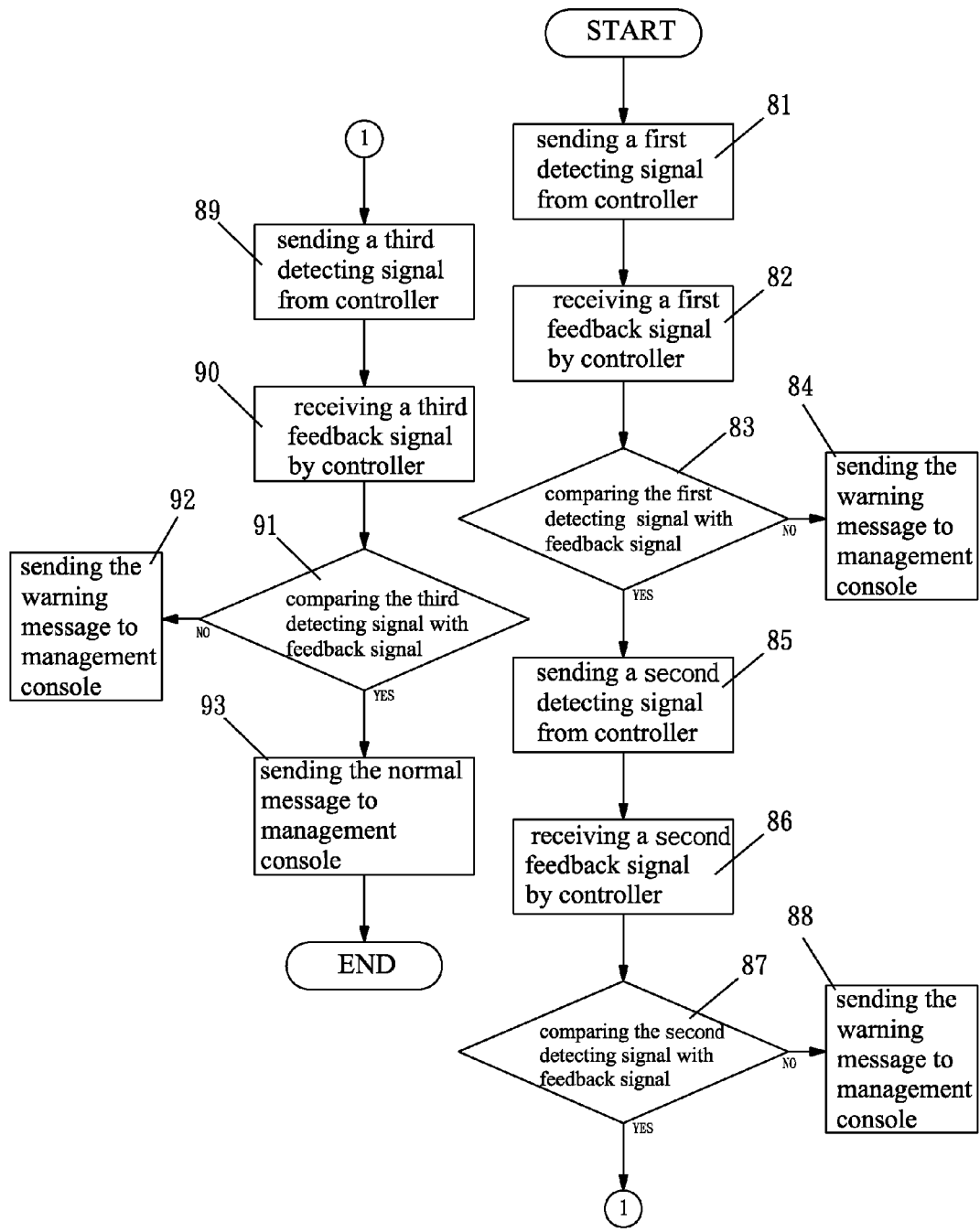
FIG. 4 is a flow diagram demonstrating the monitoring process of a digital signage displays monitoring device according to the present invention.

Referring to FIGS. 3 and 4, the monitoring device according to the present invention implemented to the digital signage is illustrated. First of all, the detector 20 at one end of the controller 10 is attached to the surface of the digital signage display 60. Then, the connector 30 at the other end of the controller 10 is plugged to the digital signage player 40. The player 40 controls the digital signage display 60. Next, the controller 10 sends different detecting signals continuously to the digital signage player 40 which further sends the detecting signals to the digital signage display 60. Feedback signals. which are from the display 60 received by the sensors 22, 24, 26 of detector 20. are sent back to the controller 10. After that, the feedback signals and the detecting signals are compared with each other and analyzed by a predetermined program in the controller 10, and a result signal is generated by the controller 10. A warning message, which is based on the result signal and indicates the digital signage display 60 being normal or abnormal, is sent to the management console 70 by the network device disposed in the player 40. At last, the operator in the management console 70 performs the subsequent processing in accordance with the warning message.

An example of the monitoring process of a digital signage displays monitoring device according to the present invention is illustrated with the flow diagram shown in FIG. 4. In step 81, the controller 10 sends a first detecting signal (i.e., blue light signal) to the digital signage player 40 which further transmits the first detecting signal to the digital signage display 60. In step 82, the sensor 22 of the detector 20 detects if the blue light signal is on the display 60, and sends a first feedback signal back to the controller 10. In step 83, the controller 10 compares the first detecting signal to the first feedback signal with the predetermined program. In step 84, if the two signals are inconsistent from each other, the controller 10 sends out an abnormal signal. In step 85, if the two signals are coincident with each other, the controller 10 sends a second detecting signal (i.e., red light signal) to the digital signage player 40 which transmits the second detecting signal to the digital signage display 60. In step 86, the sensor 24 of the detector 20 detects if the red light signal is on the display 60, and sends a second feedback signal back to the controller 10. In step 87, the controller 10 compares the second detecting signal to the second feedback signal with the predetermined program. In step 88, if the two signals are inconsistent from each other, the controller 10 sends an abnormal signal. In step 89, if the two signals are coincident, step 89 is processed. In step 89, the controller 10 sends a third detecting signal (i.e., green light signal) to digital signage player 40, and the digital signage player 40 transmits the green light signal to the digital signage display 60. In step 90, the sensor 26 of the detector 20 detects if the green light signal is on the display 60, and sends a third feedback signal back to the controller 10. In step 91, the controller 10 compares the third detecting signal to the third feedback signal with the predetermined program. In step 92, if the two signals are inconsistent from each other, the controller 10 sends an abnormal signal in step 92. In step 93, if the two signals are coincident with each other, the controller 10 sends a normal signal. Then, the process returns to the start step to monitor the digital signage display 60 continuously. A warning message, which is corresponding to the normal signal or the abnormal signal, is delivered to the management console 70 to allow the operator to carry out the subsequent process according to the warning message. If the warning message corresponding to the abnormal signal is received by the management console 70, it means the digital signage 50 is out of order, and the management console 70 needs to dispatch maintenance personnel to fix the failure digital signage 50. If the warning message corresponding to the normal signal is received by the management console 70, it means the digital signage 50 is in normal condition, and the management console 70 keeps monitoring the digital signage 50 without any further actions. Therefore, the digital signage 50 is easily monitored without changing the structure thereof, and the only thing has to be done is that the digital monitoring device according to the present invention is simply attached to the digital signage 50. Besides, the single management console 70 can monitor a plurality of digital signage 50 with the network device to realize display conditions of the digital signage 50 instantly.

Figure 5:
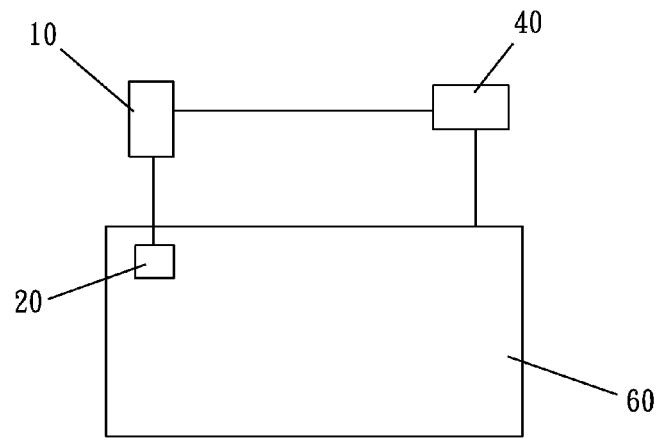
FIG. 5 is a plan view illustrating how the monitoring device of the present invention working on a digital signage.
Figure 6:
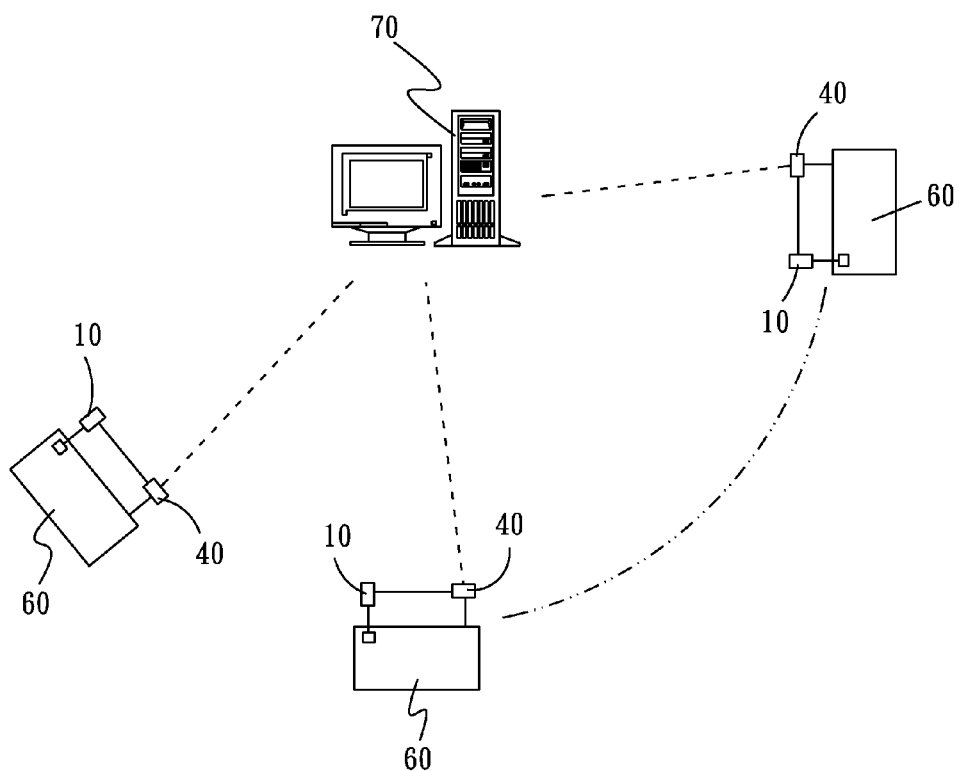
FIG. 6 is a plan view illustrating a remote control center monitoring a plurality of digital signage at the same time.

Referring to FIGS. 5 and 6, a single management console 70 can monitor a plurality of the digital signage 50. If one of the digital signage displays 60 is out of order, the digital signage player 40 can send a warning message corresponding to the abnormal signal to the management console 70. The management console 70 is aware of which one of the digital signage 50 being out of order after receiving the abnormal signal, and repair persons are notified to fix it rapidly. Accordingly, the efficiency of maintenance and repair for the digital signage 50 is improved substantively. In addition to being able to reduce the investment cost of the equipment, the monitoring efficiency is enhanced greatly. Undoubtedly, the digital monitoring device of the present invention offers a considerable progress in the field of digital signage. The controller 10 sending different detecting signals such as the blue light signal, red light signal and green light signal continuously to the digital signage player 40 as they are mentioned above is exemplary explanation and not to limit the invention. The controller 10 sending different detecting signals, changing the order of sending the signals, or sending a single detecting signal (i.e., white light signal), is within the scope of the appended claims of the present invention.

Figure 7:
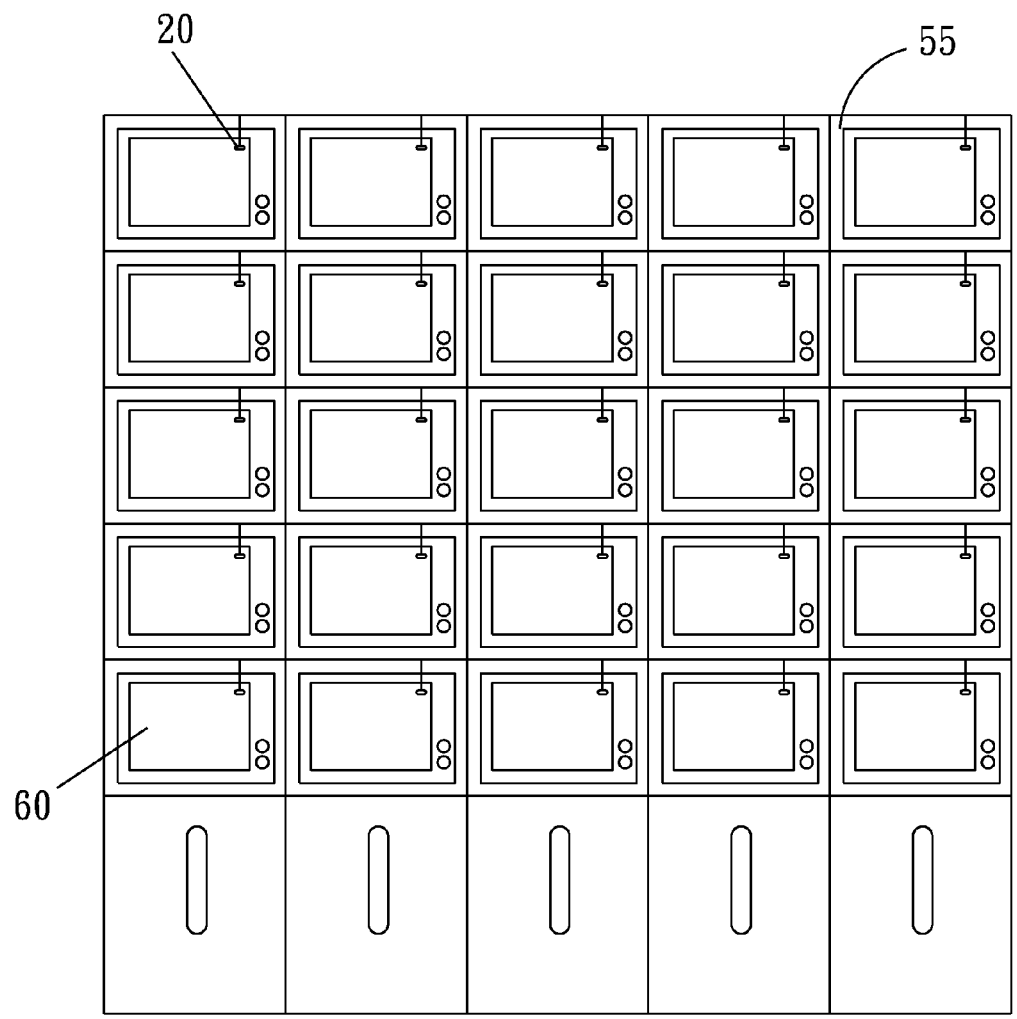
FIG. 7 is a plan view illustrating another embodiment of the present invention.

Referring to FIG. 7, another embodiment of the digital monitoring device according to present invention is illustrated. A predetermined position of each display the video wall 55 is attached with a detector 20 respectively. Similar to the detector 20 illustrated in FIGS. 5 and 6, the detector 20 is connected to one end of the controller 10, and the other end of controller 10 is plugged to the player 40 of video wall 55 (not show in FIG. 7). By the same token, each controller 10 sends different detecting signals continuously to a digital signage player 40 corresponding to the controller, and each detector 20 detects the corresponding display 60 and sends a feedback signal back to controller 10; the controller 10 compares the detecting signal with the feedback signal by the predetermined program. If the two signals are inconsistent from each there, the controller 10 sends out an abnormal signal; if the two signals are coincident with each other, the controller 10 sends out a normal signal; then, the warning message corresponding to the normal or abnormal signal is delivered to the management console 70 for further processing as it is recited previously, and no detail will be described further.

Furthermore, the controller 10 and the player 40 can be integrated into one module, i.e., the controller 10 is embedded in the player 40 such that the connector 30 is not required any more; or the controller 10 and the sensors 22, 24, 26 can be integrated into one module, i.e., the sensors 22, 24, 26 are embedded in the controller 10 such that it is unnecessary to have connection wires between the sensors 22, 24, 26 and the controller 10; or the controller 10, the sensors 22, 24, 26, and the player 40 are integrated into a module such that it is unnecessary to have the connector 30 and the connection wires. These are belong to simple changes of the scope of the claims appended to the present invention. It is noted that the digital signage 50 and video wall 55 illustrated in FIG. 7 are for exemplary explanation only and not for limiting the invention. The device of present invention is applicable to other similar public displays.

While the invention has been described with referencing to preferred embodiments thereof, it is to be understood that modifications or variations may be easily made without departing from the spirit of this invention which is defined by the appended claims.

What is claimed is:

1. A monitoring device for a digital signage which has a digital signage display, a digital signage player with a network device, and a management console, comprising:
   a controller with two ends having a predetermined program installed therein;
   a detector with a or a plurality of sensors being attached to a predetermined position of the display, and connecting with one of the ends of the controller;
   a connector connecting with the other end of the controller and the player respectively;
   wherein the controller sends a detecting signal to the player via the connector, and the player transmits the detecting signal to the display; the respective sensor detects the detecting signal on the display, and sends a feedback signal to the controller; the controller compares the detecting signal to the feedback signal with the predetermined program, analyzes the comparison, and generates a result to indicate the display being in normal condition or out of order; a warning message corresponding to the result is sent to the manage console via the network device.

2. The monitoring device according to claim 1, wherein a single sensor is disposed in the detector.

3. The monitoring device according to claim 1, wherein has two or more sensors are disposed in the detector.

4. The monitoring device according to claim 1, wherein the detector is adhered to or fastened to the display.

5. The monitoring device according to claim 1, wherein the controller communicates with the digital signage player with the connector.

6. The monitoring device according to claim 1, wherein the connector is USB, RS-232, Bluetooth or one of other electrical connectors.

7. The monitoring device according to claim 1 is used in a video wall.

8. The digital signage monitoring device according to claim 1, wherein the controller and the digital signage player are integrated into one module.

9. The digital signage monitoring device according to claim 1, wherein the controller and the sensors are integrated into one module.

10. The digital signage monitoring device according to claim 1, wherein the controller, the sensor, and the digital signage player are integrated into a module.

* * * * *